United States Patent Office 2,822,819
Patented Feb. 11, 1958

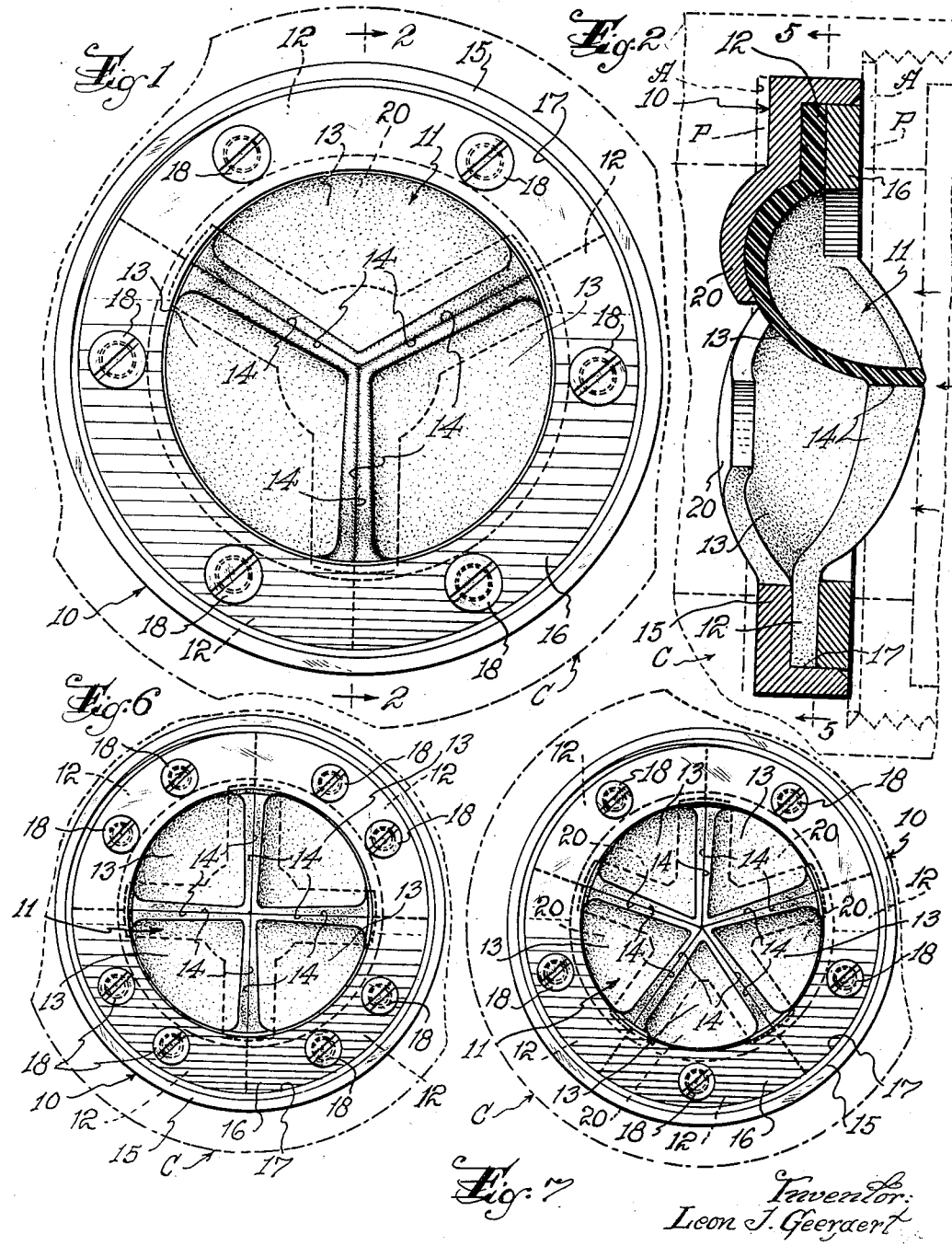

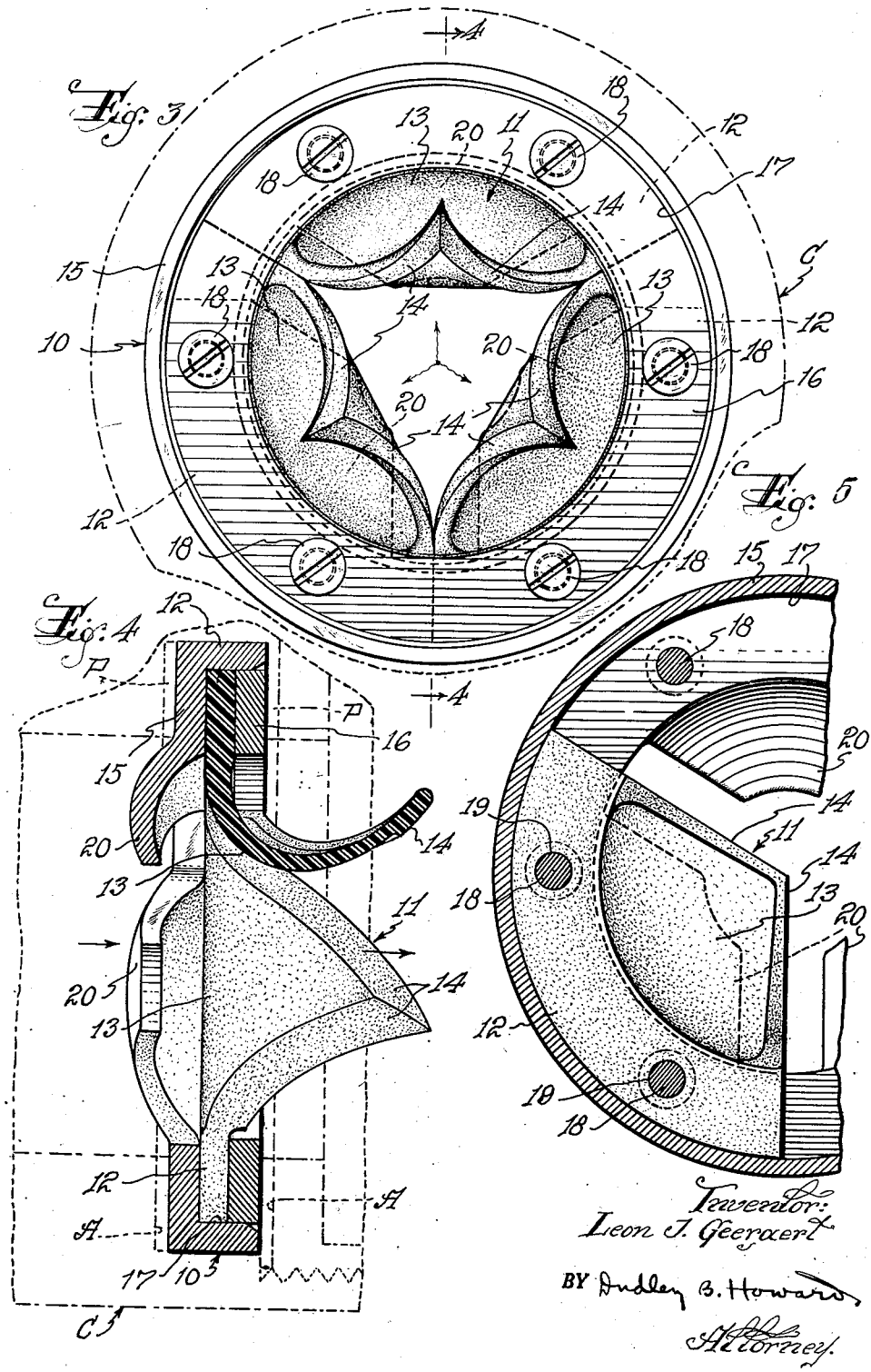

2,822,819

CUSPATE CHECK VALVE

Leon Jean Geeraert, Brooklyn, N. Y., assignor to Geeraert Corporation, New York, N. Y., a corporation of New York Application August 7, 1953, Serial No. 372,922

4 Claims. (Cl. 137—525.1)

The invention relates to check valves of the general hinged flap type, and has for its primary object to provide a valve that is peculiarly suited to use in the circulatory system of blood pumping apparatus such as is used to relieve a human heart of its normal function in order that it may be at rest and in the most favorable condition while being subjected to a surgical operation.

The cardiac valves of the human anatomy have soft, flexible and resilient segmental cusps which interseat at their radially disposed free edges to afford dilatable commissures that open under the applied pressure of blood to permit flow therethrough in one direction only. This natural valve does not injure the blood by crushing or bruising the corpuscles such as would occur on the use of conventional man-made valves having metallic movable valve members and seats therefor that close with hard impact.

In devising a check valve for a so-called "artificial heart," it was deemed wise to adhere as closely as possible to the structure and principle of operation of the natural cardiac valve. In so doing, it became necessary to use soft natural or synthetic rubber, or a rubber substitute, in the fabrication of the interseating cusps that compose the movable valve element. However, the use of material of this kind presented a mechanical problem that appeared at first to be incapable of solution. The valve cusps must be concavo-convex, or dished, in cross-section so have to be produced by molding process. In order to make them integral with the peripheral portion of the valve, when molded, some way had to be devised to produce the radial slits that divide the central area into the individual, relatively movable cusps. In the use of soft rubber, that cannot be done satisfactorily by cutting process, which leaves edge faces that do not fit together evenly enough to afford a perfect fluid seal when the movable valve cusps are in closed condition.

After exhaustive experimentation, the problems was solved by molding the several cusps of the movable valve element in the form of separate segmental sections to be assembled in an annular valve body. It was entirely practicable in this way to produce true seating edges for the cusps, with the further advantage that the segmental sections are identical in construction and therefore interchangeable and thus individually replaceable when damaged in use.

Another important object of the invention is to provide the valve with means to prevent accidental collapse of the flexible cusps backward with respect to the direction of blood flow and thereby avoid danger of regurgitation under conditions wherein, due to faulty speed control of the artificial heart pump or other cause, the pressure ahead of the valve becomes excessively high. This collapse preventing means also renders the valve well suited for use in high pressure commercial pumps.

Other objects, advantages and features of the invention will become apparent as the following specific description is read in connection with the accompanying drawings, in which:

Fig. 1 is a large-scale front elevation of a tricuspid valve constructed in accordance with the invention, showing the valve in closed condition; Fig. 2 is an axial section on line 2—2 of Fig. 1; Fig. 3 is a view similar to Fig. 1, showing the valve open; Fig. 4 is an axial section on line 4—4 of Fig. 3; and Fig. 5 is fragmentary cross-sectional view on line 5—5 of Fig. 2, showing all but one cusp segment removed.

Fig. 6 is a front elevation similar to Fig. 1, but on a reduced scale, of a valve having four cusps; and Fig. 7 is a similar view of a valve having five cusps.

Referring now in detail to the drawings, in which like reference characters designate corresponding parts in the several views, it will be observed that the invention in its preferred form is a very compact valve unit of extremely simplified construction which is adapted to be installed in a fluid conduit, such as a tube or other passage of the circulatory system of an artificial blood pump, to completely control the flow therethrough in restriction to one direction only. The valve unit comprises two principal elements, viz: valve body 10 and movable valve element 11.

Valve body 10 may be of any desired cross-sectional configuration, but is illustrated by way of example in the drawings as being annular in form to fit the cylindrical interior of the usual conduit C, represented in broken lines in Figs. 2 and 4, wherein said valve body may be clamped between opposed internal annular flanges or equivalent abutments A with interposition of packing rings P to seal the joint. The specific structure of valve body 10 must conform to the shape and dimensions of movable valve element 11, so the structure of the latter will be described before proceeding further with details of said valve body.

It will be noted that movable valve element 11 resembles in some respects the structure of a valve of the human heart, the tricuspid embodiment in Figs. 1 to 5 in particular being closely corresponding to the aortic valve. However, for the practical reasons previously mentioned herein, the complete movable valve element has been made in separate cuspate sections forming equal segments of a circle. In the Figs. 1 to 5 embodiment, for example, there are three sections, each of which is identical with its mates, thereby permitting interchange and individual replacement.

In the manufacture of the improved valve, soft rubber of high quality is preferred, but it is within the scope of the invention to substitute other equivalent materials such as plastics, impervious fabrics, and the like.

As shown in Figs. 2, 4 and 5 in solid lines, the several mated valve element sections have arcuate outer flange portions 12 which unite, when the sections are assembled in valve body 10, to form a flat flange of 360 degrees extent lying substantially in a plane at right angles to the valve axis. Each section includes an inwardly presented cusp 13 arranged so that, when the sections are assembled, the free points of all mated cusps converge at the valve axis. As shown particularly in Fig. 2, each cusp 13 is concavo-convex in axial section and its wide root portion, which merges into flange portion 12, is arranged to bulge axially from the latter in the direction opposite to fluid flow. The remaining portion of each cusp 13 is curved reversely in the direction of flow and extends beyond the plane of flange portion 12. In other words, the cusp curvature from root to tip and the arrangement relative to flange portion 12 are such that, when the mated sections are assembled in valve body 10, their seating edge faces 14 will meet evenly in equiangularly disposed planes that intersect the common valve axis. It will be observed that, in axial section, each cusp is tapered in thickness from the root toward the tip to increase the flexibility in the region of the tip and thereby facilitate valve opening action in proportion to the rise in blood pressure in back of the valve.

Valve body 10 comprises two principal parts, viz: ring 15 and clamping gland 16. Ring 15 is recessed at 17 to receive the composite flange 12—12—12 of the respective sections of movable valve element 11. Recess 17 is deeper than the thickness of said flange in order to countersink clamping gland 16 on the outside of the flange. Clamping gland 16 may be caused to press against flange 12—12—12 by use of any suitable means, but whatever means is selected for the purpose must not apply torque to the movable valve element 11. In the development of my valve, I originally utilized a screw-threaded connection between clamping gland 16 and the internal wall of recess 17, but found that objectionable torque was exerted upon the individual sections of the movable valve member such as to cause rotational displacement and uneven interseating of their radial meeting edges. I finally chose to use axial lag screws 18 that penetrate perforations 19 in the respective sections of movable valve element 11. It is preferred to use two or more clamping screws 18 for each section in the tricuspid valve or the bicuspid type (not shown) but fewer may be required in those valves that have four or more sections.

Projecting radially inward from ring 15 of valve body 10 in rear of the respective cusp roots of movable valve element 11 are a corresponding number of circumferentially spaced cupped backing abutments, or reinforcements, 20 for contact with the rear faces of said cusp roots when the cusps are in the relaxed valve-closed positions shown in Fig. 2. The shape of the front face of each backing abutment 20 should conform evenly to the rear face of the corresponding cusp root, but said abutments should present a much smaller area of contact than the entire rear face area of the cusp roots in order that there may be provision of a passage of sufficient size for fluid flow through the valve when it is open. To this end, the side edges of the respective backing abutments 20 are spaced apart circumferentially and the innermost parts thereof are cut away circularly.

*Operation*

When there is no pressure impulse to open the valve, its valve cusps will be seated along the meeting radial commissure edges and the cusp roots will be in relaxed condition in contact with backing abutments 20 of valve body 10, as depicted in Figs. 1 and 2. However, when a pressure impulse commences to build up in back of the valve, the cusp tips will start to flex forwardly, due to their thinness as compared with the root portions, and thereby cause gradual opening of the valve in direct proportion to the increase in pressure. As the pressure reaches its peak, the valve cusps will be fully open, as shown in Figs. 3 and 4.

As previously stated, there may be any desired number of valve cusps depending upon the service which the valve is required to perform. Of the variations that are permissible, Fig. 5 shows a valve with four cusps and Fig. 6 shows one with five cusps. The principles of construction and operation are the same in all variations.

It will be understood that it is intended to cover all changes and modifications of the examples of the invention herein chosen for the purpose of illustration which do not constitute departures from the spirit and scope of the invention.

Having thus described the invention, I claim:

1. A check valve comprising: an annular valve body; and a movable valve element mounted in the valve body in closing relation thereto and including more than two separate identical mated sections of segmental form having respective peripheral portions removably secured to the valve body with their radial side edges in abutting relation and inwardly presented cusps of concavo-convex axial section projecting in the direction of normal fluid flow and arranged so that their concave faces are radially outwardly presented and their radial free edges interseat when in closed condition, said sections being composed of soft, flexible and resilient material and being adapted to flex in the direction of fluid flow to open the valve under the influence of fluid pressure in back of said cusps, the peripheral portion of each section of the movable valve element having an arcuate flange portion lying in a plane at right angles to the valve axis and the valve body having an annular recess in which the flange portions of all sections are removably fitted to complete a circular composite flange, and means to clamp said flange portions in the valve body recess, said clamping means including an annular clamping gland countersunk in the valve body recess on the outside of said flange portions of the movable valve element, and at least one axially extending lag screw penetrating said gland and each of said flange portions and having adjustable screwthreaded engagement with the valve body.

2. A check valve comprising: an annular valve body having inwardly presented radially projecting and circumferentially spaced backing abutments; and a movable valve element mounted in the valve body in front of the backing abutments of the valve body with respect to the normal direction of fluid flow, said movable valve element including segmental cusps of soft, flexible and resilient material equal in number to said backing abutments and arranged directly in front of the respective abutments and projecting in the direction of fluid flow with their free radial edges interseated in closed condition to form dilatable commissures adapted to open only under forward fluid pressure, said cusps being arranged to contact the respective backing abutments when in relaxed closed position.

3. A check valve as defined in claim 2, wherein each cusp of the movable valve element is concavo-convex in axial section and disposed with the concave face forwardly presented, and wherein the front face of each backing abutment of the valve body is concave and conforms a curvature to the convex rear face of the corresponding valve cusp for even contact therewith when the valve is closed.

4. A check valve as defined in claim 3, wherein each backing abutment has its front, inner portion cut away circularly to afford a fluid passage concentric to the valve axis.

References Cited in the file of this patent

UNITED STATES PATENTS

| Re. | 682 | Peale | Apr. 5, 1859 |
|---|---|---|---|
| | 168,776 | Painter | Oct. 11, 1875 |
| | 270,853 | Sinclair | Jan. 16, 1883 |
| | 584,091 | Leidich | June 8, 1897 |
| | 2,092,757 | Groeniger | Sept. 13, 1937 |
| | 2,201,837 | Schanck | May 21, 1940 |
| | 2,236,477 | Fuchs | Mar. 25, 1941 |
| | 2,687,707 | O'Shei | Aug. 31, 1954 |
| | 2,750,959 | Von Seggern | June 19, 1956 |

FOREIGN PATENTS

| 571,874 | Germany | Mar. 6, 1933 |
|---|---|---|
| 56,903 | Denmark | of 1939 |